United States Patent
Saha et al.

(10) Patent No.: US 7,489,742 B2
(45) Date of Patent: Feb. 10, 2009

(54) SYSTEM AND METHOD FOR CLOCK RECOVERY IN DIGITAL VIDEO COMMUNICATION

(75) Inventors: Kaushik Saha, Delhi (IN); Chiranjib Chakraborty, Kolkata (IN); Subrata Chatterjee, Dist. Purulia (IN)

(73) Assignee: STMicroelectronics Pvt. Ltd., Noida, Uttar Pradesh (IN)

( * ) Notice: Subject to any disclaimer, the term of this patent is extended or adjusted under 35 U.S.C. 154(b) by 626 days.

(21) Appl. No.: 11/254,069

(22) Filed: Oct. 19, 2005

(65) Prior Publication Data

US 2006/0209989 A1     Sep. 21, 2006

(30) Foreign Application Priority Data

Oct. 20, 2004    (IN)    ................ 2052/DEL/2004

(51) Int. Cl.
    *H04L 27/00*    (2006.01)
(52) U.S. Cl. .................. 375/326; 375/371; 713/400; 713/401
(58) Field of Classification Search .......... 375/326, 375/371; 700/400, 401
    See application file for complete search history.

(56) References Cited

U.S. PATENT DOCUMENTS

| | | | |
|---|---|---|---|
| 5,652,627 A | 7/1997 | Allen | |
| 5,828,414 A | 10/1998 | Perkins et al. | |
| 6,049,886 A * | 4/2000 | Motoyama | .............. 713/400 |
| 6,377,588 B1 | 4/2002 | Osaki | |
| 6,650,719 B1 * | 11/2003 | Baker | .............. 375/371 |

OTHER PUBLICATIONS

"Generic Coding Of Moving Pictures And Associated Audio: Systems"; ISO/IEC 13818-1; Nov. 1994; Switzerland; retrieved online at: http://66.218.69.11/search/cache?p=generic+coding+of+moving+pictures+and+associated+audio%3A+systems&fr=FP-tab-web-t334&toggle=1&ei=UTF-8&u=neuron2.net/library/mpeg2/iso138181.doc&w=generic+coding+moving+pictures+associated+audio+systems&d=bxRbkzmtMwpt&icp=1&.intl=us and neuron2.net/library/mpeg2/iso138181.doc(WORD).

(Continued)

*Primary Examiner*—Curtis B Odom
(74) *Attorney, Agent, or Firm*—Hogan & Hartson LLP

(57) ABSTRACT

A system for clock recovery in digital video communication includes a delay measurement block for generating PCR input signals and for continuously determining the time interval between successive PCR input signals. The system also includes a first storage device for generating a first PCR signal corresponding to the time interval between arrival of successive PCR input signals and a PCR inter-arrival time computation filtering device to determine the average time of arrival difference between successive PCR packets. The system further includes an error correction device for minimizing error in the average PCR difference between successive PCR packets, a controlled system clock generator coupled to the output of the error correction device to generate system clock, a second storage device for generating a first system clock output, and a controlled clock period difference computation element for computing the clock period difference between the first and second system clock outputs. The controlled clock period difference computation element is coupled at its output to the error correction device to form a feedback circuit to minimize error between the system clock output and successive PCR differences.

17 Claims, 7 Drawing Sheets

OTHER PUBLICATIONS

"Digital broadcasting systems for television, sound and data services; Framing structure, channel coding and modulation for Nov. 12 GHz satellite services EN 300 421 (V1.1.2:Aug. 1997)"; Digital Video Broadcasting; European Telecommunications Standards Institute; retrieved online at: http://www.bjpace.com.cn/data/tec/tec-DVB/DVB%20BlueBooks%20Standards/Specifications%20and%20Standards/transmission/dvb-s/En300421_e1.pdf; pp. 1-24.

"Digital broadcasting systems for television, sound and data services; Framing structure, channel coding and modulation for digital terrestrial television EN 300 744 (V1.2.1:Aug. 1997)"; Digital Video Broadcasting; European Telecommunications Standards Institute; retrieved online at: http://www.bjpace.com.cn/data/tec/tec-DVB/DVB%20BlueBooks%20Standards/Specifications%20and%20Standards/transmission/dvb-t/En300744_e1.pdf; pp. 1-47.

* cited by examiner

SYSTEM AND METHOD FOR CLOCK RECOVERY IN DIGITAL VIDEO COMMUNICATION

RELATED APPLICATIONS

The present application claims priority from India Patent Application No. 2052/Del/2004 filed as a provisional application on Oct. 20, 2004, for which a complete specification was filed on Oct. 14, 2005, both of which documents are incorporated herein in their entireties by this reference.

FIELD OF THE INVENTION

This invention relates to a system and method for clock recovery in digital video communication.

BACKGROUND OF THE INVENTION

In conventional digital video communication systems data is made available to the customers' home television set at the request or demand of the customer. Customers select a channel and enter a code into a box (widely known as set top box) at home, and the program gets delivered. Such universal video-on-demand requires massive amounts of audio/video data multiplexing. This multiplexing is done as per the MPEG2 system standard (13818-1). Each set top box must receive data and then process it to produce a continuous-high-quality-audio/video-program.

In a Digital Video Broadcast (DVB) communication system audio/video data is transmitted in a transport stream. A decoding Time Stamp (DTS) and a Presentation Time Stamp (PTS) specify the time instance at which the packet should be decoded and presented, respectively. DTS and PTS are all referenced to the encoder's SYSTEM TIME CLOCK (STC) running at 27 MHz. Samples of the STC clock known as PCR values are transmitted in transport stream packet at regular time interval to the decoder and the reference time is reconstructed by means of these clock samples and a standard Phase Locked Loop (PLL).

FIG. 1 shows a conventional system setup for a clock recovery application. Here, an MPEG2 transport stream is fed to a DVB-T modulator via a transport stream packet injector. The modulator outputs a Coded Orthogonal Frequency Division Multiplexing (COFDM) signal, which is demodulated and detected by a front-end STB tuner. The output of the front-end tuner is a 188-byte transport stream packet, which contains both audio and video data. The STB back-end, which contains a CPU, decodes these transport stream packets and decoded audio/video data is fed to a television. For audio/video time synchronization, a 27 MHz VCXO is used in the STB back-end. In a practical scenario (DVB communication), the transport stream is received by an antenna and the antenna output is fed to an STB front-end.

FIG. 2 shows an existing system for clock recovery as disclosed by the publication entitled "A New Method of Clock Recovery in MPEG Decoders" by Hooman Hassanzadegan and Nima Sarshar, Iran. It shows the addition of a random value to the PCR value generated in the PCR generation block to indicate jitter. The simulation results show that the time spacing between every two consecutive PCRs is 0.1 second.

The drawback in the above mentioned system is that the computation involved for clock recovery requires a complex and high cost apparatus.

Correct clock recovery at the Set Top Box (STB) receiver side is essential for audio/video synchronization. However, there are several factors that lead to degradation in the clock recovery process. Some of these factors are:

The difference between the transmitter system clock frequency and the receiver STC frequency (Frequency of the voltage controlled oscillator);

Introduction of a significant amount of jitter by communication channel;

Delay introduced by the inner interleaving and de-interleaving blocks in the transmitter and receiver side (particularly in DVB-TERRESTRIAL transmission); and In worst case channel conditions (such as ¼ guard interval, channel fading, low carrier-to-noise ratio etc.), arrival of Program Clock Reference (PCR) packets being delayed as the STB tuner front-end takes too much time to detect and demodulate the signal.

In DVB-Terrestrial (DVB-T) communication, uncertain arrival of PCR packets at the receiver end causes serious problems in synchronization of receiver system clock with that of the transmitter.

The conventional methods available to overcome this aspect cannot reduce all the problems, specifically in worst case channel conditions. Problems such as color loss, jittery video, and audio dropouts still persist. Apart from this, existing methods have high computational overhead.

Thus, a need is felt for a clock recovery system that overcomes the clock recovery problems in the presence of PCR packet jitters in digital video communication.

SUMMARY OF THE INVENTION

It is an object of the present invention to provide a system for clock recovery in digital communication.

It is another object of the present invention to compute the average arrival time of the PCR packets.

It is further an objective of the present invention to synchronize the average arrival time of the PCR packets with the System Clock Frequency.

It is yet another object of the present invention to provide a low complexity and low-cost solution to clock recovery problem in the presence of large clock jitter in DVB-T communication.

To achieve said objectives the present invention provides a system for clock recovery in digital communication, comprising:

a delay measurement block for generating Program Clock Reference (PCR) input signals and for continuously determining time interval between successive PCR input signals, a first storage device coupled to the output of said delay measurement block for generating a first PCR signal corresponding to said time interval between arrival of successive PCR input signals, a PCR inter-arrival time computation filtering device coupled at its first input to the output of said storage device and receiving a second PCR signal from said delay measurement block for determining the average time of arrival difference between successive PCR packets, an error correction device coupled to the output of said PCR difference measurement element for minimizing the error in the average PCR difference between successive PCR packets, a controlled system clock generator coupled to the output of said error correction device to generate system clock, a second storage device coupled at the output of said controlled system clock generator for generating a first system clock output, a controlled clock period difference computation element having one input coupled to the output of said storage element and receiving a second system clock output from said controlled system clock generator, for computing the clock period difference between said first and second system clock output, and said controlled clock period difference computation element being coupled at its output to said error correction device to form a feedback circuit for minimizing the error between said system clock output and successive PCR differences observed.

Further, the present invention provides a method for clock recovery in a digital video communication system comprising:

determining time interval between successive input PCR signals, computing average time difference between successive PCR packets, computing the average difference between successive system clock signals, minimizing the error between successive PCR packets and system clock signals, and generating successive system clock signals.

In DVB-T operation, irregularity in the arrival of PCR packets at the receiver causes serious problems in synchronization of receiver system clock with that of the transmitter. To overcome this problem, a low complexity, low-cost clock recovery system and method corrects the voltage-controlled oscillator (VCXO) at the receiver end by predicting an average PCR difference value at regular time interval instead of waiting for the delayed packets to arrive. The system and method of the present invention recovers the lost synchronization of the transmitter and receiver even in worst case channel conditions (such as ¼ guard interval, channel fading, low carrier-to-noise ratio etc.). In addition, the system and method of the present invention enjoys the benefit of very little computational overhead.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DETAILED DESCRIPTION OF THE INVENTION

Figure 1:
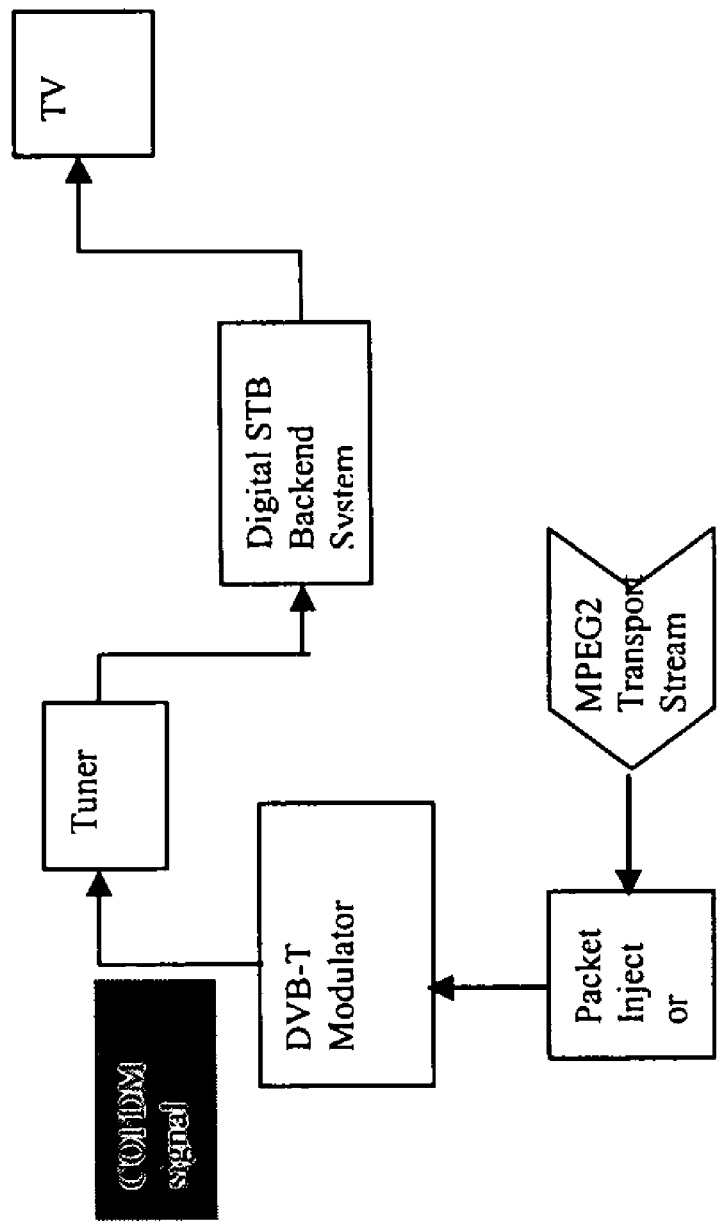
FIG. 1 illustrates a conventional system set up for clock recovery application.
Figure 2:
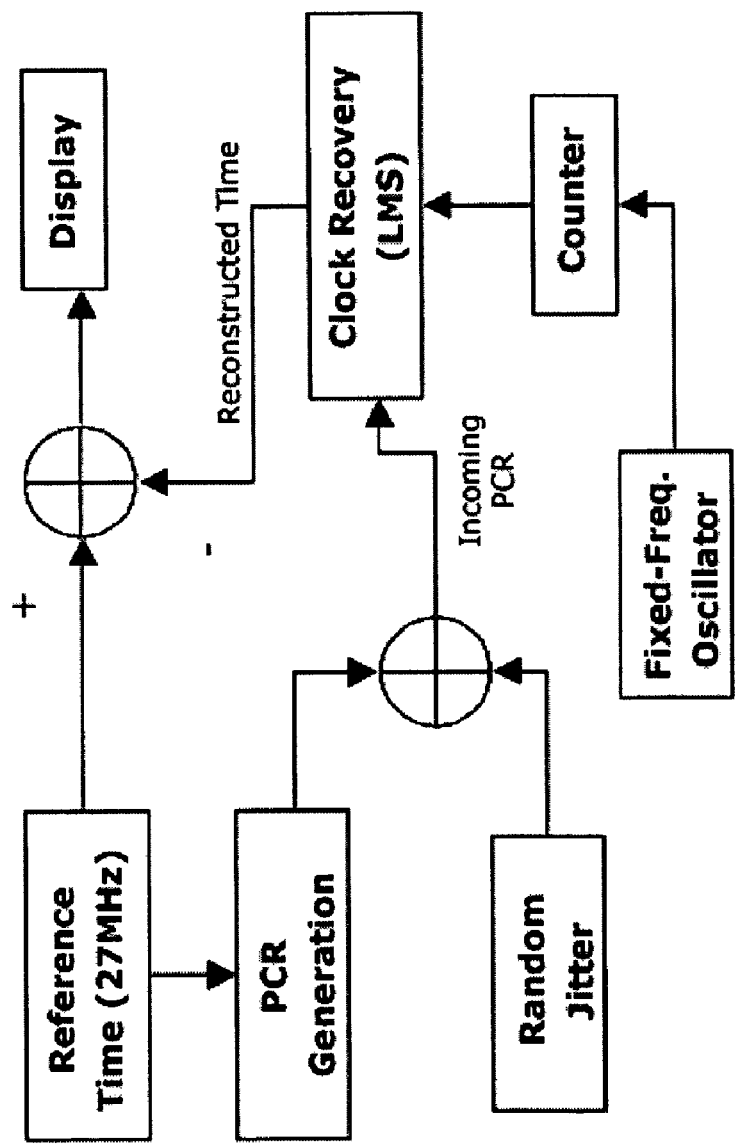
FIG. 2 illustrates another existing system for clock recovery in MPEG decoders.
Figure 3:
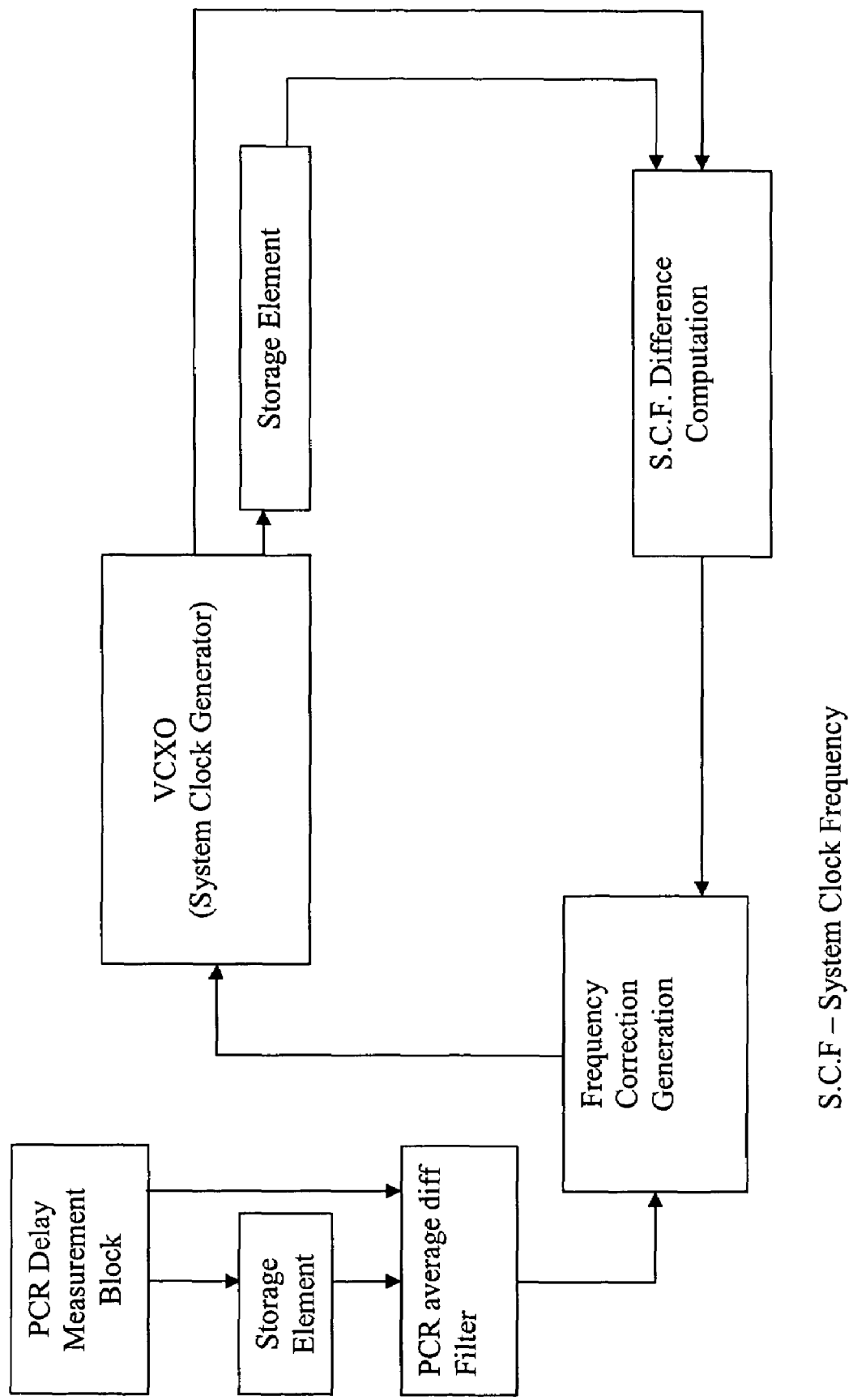
FIG. 3 shows the system for clock recovery in digital video communication in accordance with the instant invention.

The block diagram of the clock recovery system in accordance with the instant invention is shown in FIG. 3, wherein it is shown that the PCR delay measurement block generates the input PCR signals for the clock recovery system and measures the delay between the successive PCR packets. The PCR delay block comprises a logic-parsing device for providing selective PCR packet output, wherein the logic-parsing device comprising a demultiplexing logic for priority based injection of PCR packets into the clock recovery system.

Further, the output from the PCR delay measurement block is fed to a data storage device that comprises buffers or registers for introducing temporal delay in the incoming PCR data stream. The input PCR signal stream is then fed to the PCR average difference filter that computes the average inter-arrival time between the successive PCR packets. The gain factor of the filter is then compensated by coupling the filter output to a coefficient multiplier.

The gain compensated output is then fed to the differential frequency error minimization device for applying minimization to the error induced in the PCR inter-arrival time.

The system clock outputs are generated from the system clock generator, which is essentially a phase locked loop that generates the system time clock. This system time clock is the generic system clock of the Set Top Box in the digital video communication system. Two system clocks are then generated, wherein the delay between the two system clock outputs is established by introducing a storage device at one of the outputs of the system clock generator. A clock period difference computation element is coupled to the output of the system clock generator for computing the difference between the two system clock outputs. The system clock difference is further converted to a differential frequency error minimization device for converting the system clock output difference to a frequency error and applying correction to the same.

Figure 4:
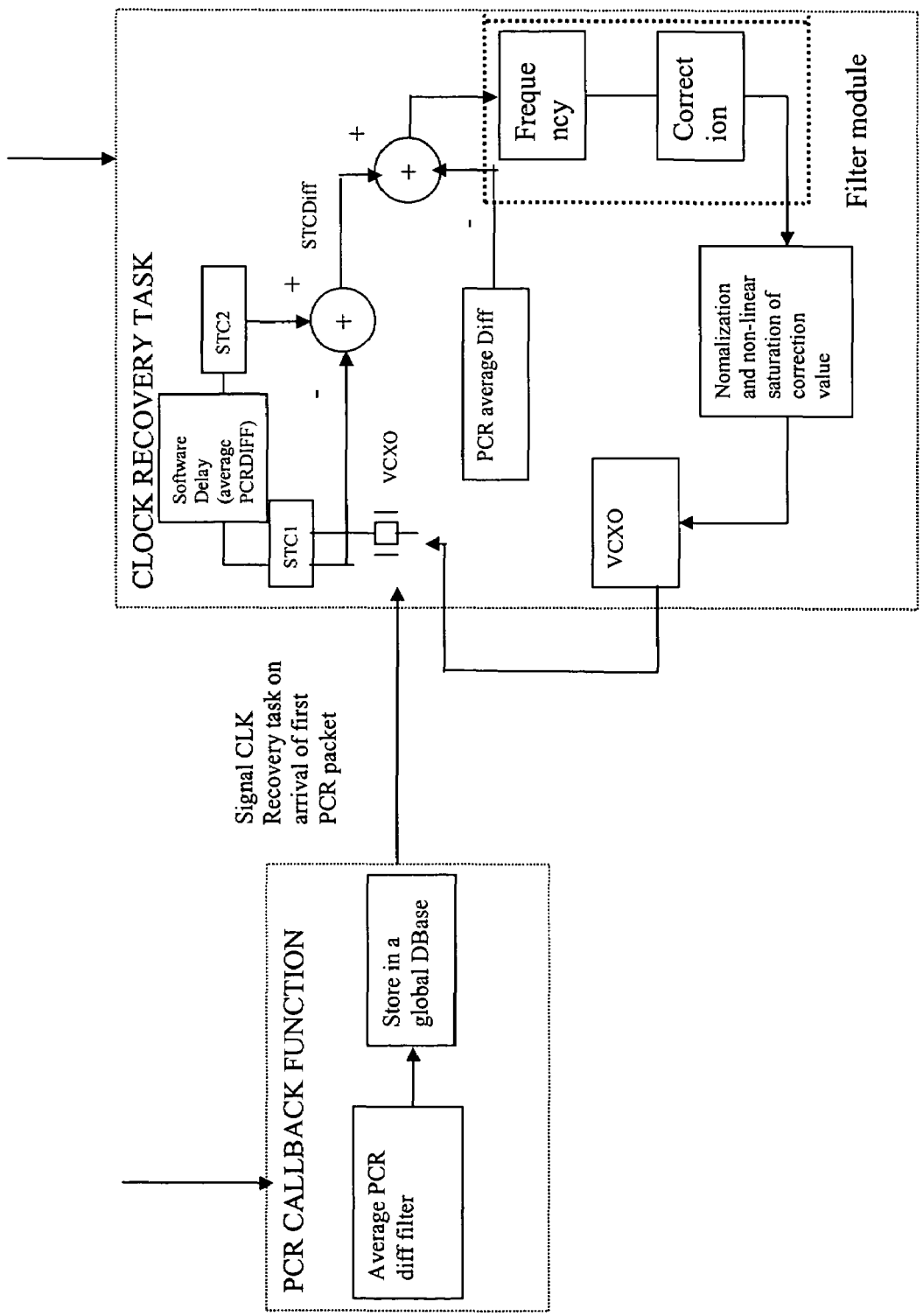
FIG. 4 shows the flow diagram of the method of clock recovery in accordance with the instant invention.

FIG. 4 shows the flow diagram of the method of clock recovery in accordance with the instant invention. The PCR call back function determines the time interval between successive input PCR signals. The average PCR difference is calculated on the arrival of PCR packets and the same is stored in a global database. The PCR call back function and the clock recovery run concurrently, and these functions can be concurrently executed in a real time operating system. The PCR call back function invokes the clock recovery task on arrival of the first PCR packet. In the section that performs clock recovery task, the voltage controlled oscillator at the receiver (VCXO) is corrected at regular intervals rather than waiting for PCR event to occur on arrival of PCR packets. This interval duration is calculated as the average PCR inter arrival time. This time interval is used to set a timer after reading the STC value (the STC value is read from the VCXO). On expiry of this timer interval, the STC value is read again. Then, from the differences of STC values, a frequency error is calculated. Frequency error is calculated using the following equations:

Difference=(STCcurrent−PCRcurrent)

PCRTickDiff=(PCRcurrent−PCRprevious)

TickError=(STCcurrent−PCRcurrent)−(STCprevious−PCRprevious)

TimeError=27000000/PCRTickDiff

FreqError=TickError*TimeError

FreqError=(TickError*27000000)/PCRTickDiff.

From the frequency error, a correction value is calculated. VCXO is then set by the correction value.

Figure 5:
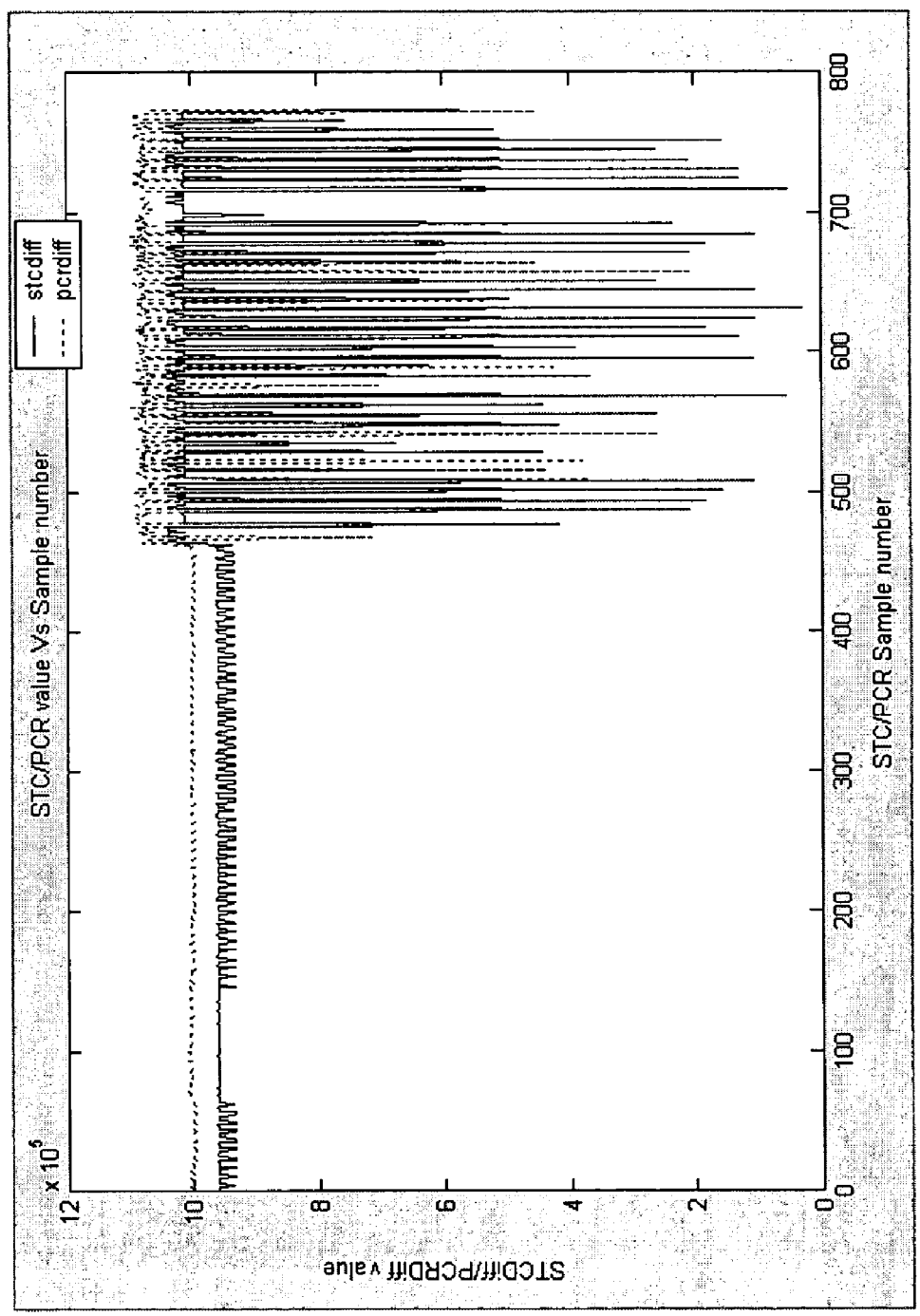
FIG. 5 shows the graph of STC and PCR difference value against sample number for the clock recovery system in accordance with the instant invention.

Due to the uncertain arrival of PCR packets at the receiver, the frequency error value remains unstable and thus the synchronization is lost for receiver system clock. The system and method of the present invention overcomes this problem. FIG. 5 shows the graph of frequency error value versus sample number for the clock recovery system and method of the present invention. It is clear from the graph that frequency error value becomes stable after some time duration, and thus solves the above-mentioned problem.

The average PCR difference is calculated using a simple IIR filter having very low computational complexity. A large time constant i.e. $|\tau|\approx 1.0$ is used to maintain a stable value of the computed average.

The transfer function of the filter is:

$$H(z) = \frac{Y(z)}{X(z)} = \frac{1}{1-\left(1-\frac{1}{128}\right)z^{-1}}.$$

As the time constant coefficient is $1-\frac{1}{128}$, the filter is implemented with simple shift and addition operations. So the computational overhead is very low for designing this filter. The filter characteristic is shown in FIG. 6.

Figure 6:
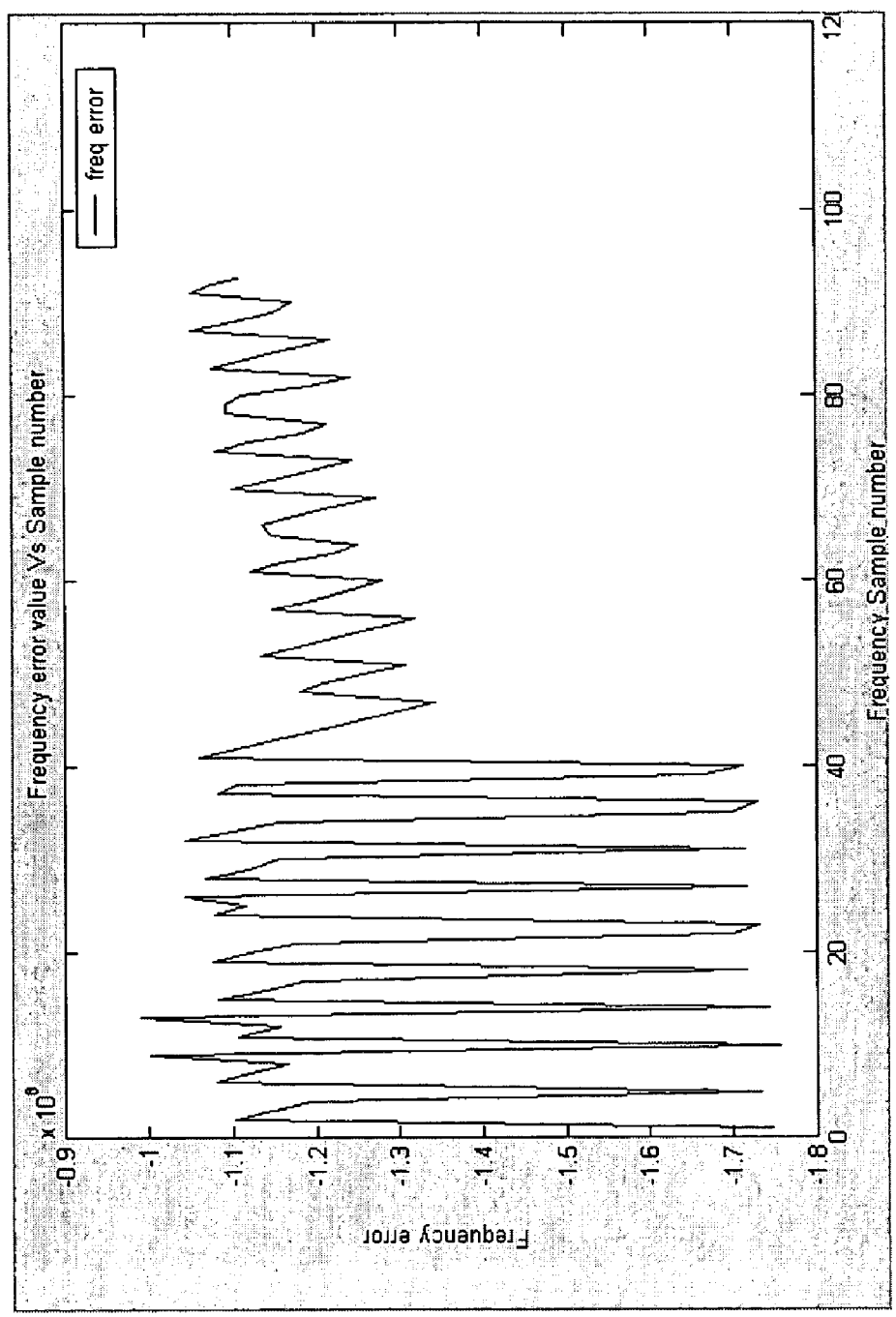
FIG. 6 shows the graph of frequency error value against sample number for the clock recovery system in accordance with the instant invention.

The graph plotted in FIG. 6 shows that after arrival of 500 PCR packets, the output of the filter (the average PCR difference value) converges to a stable state. The average PCR difference is updated with the arrival of every new PCR packet.

Figure 7:
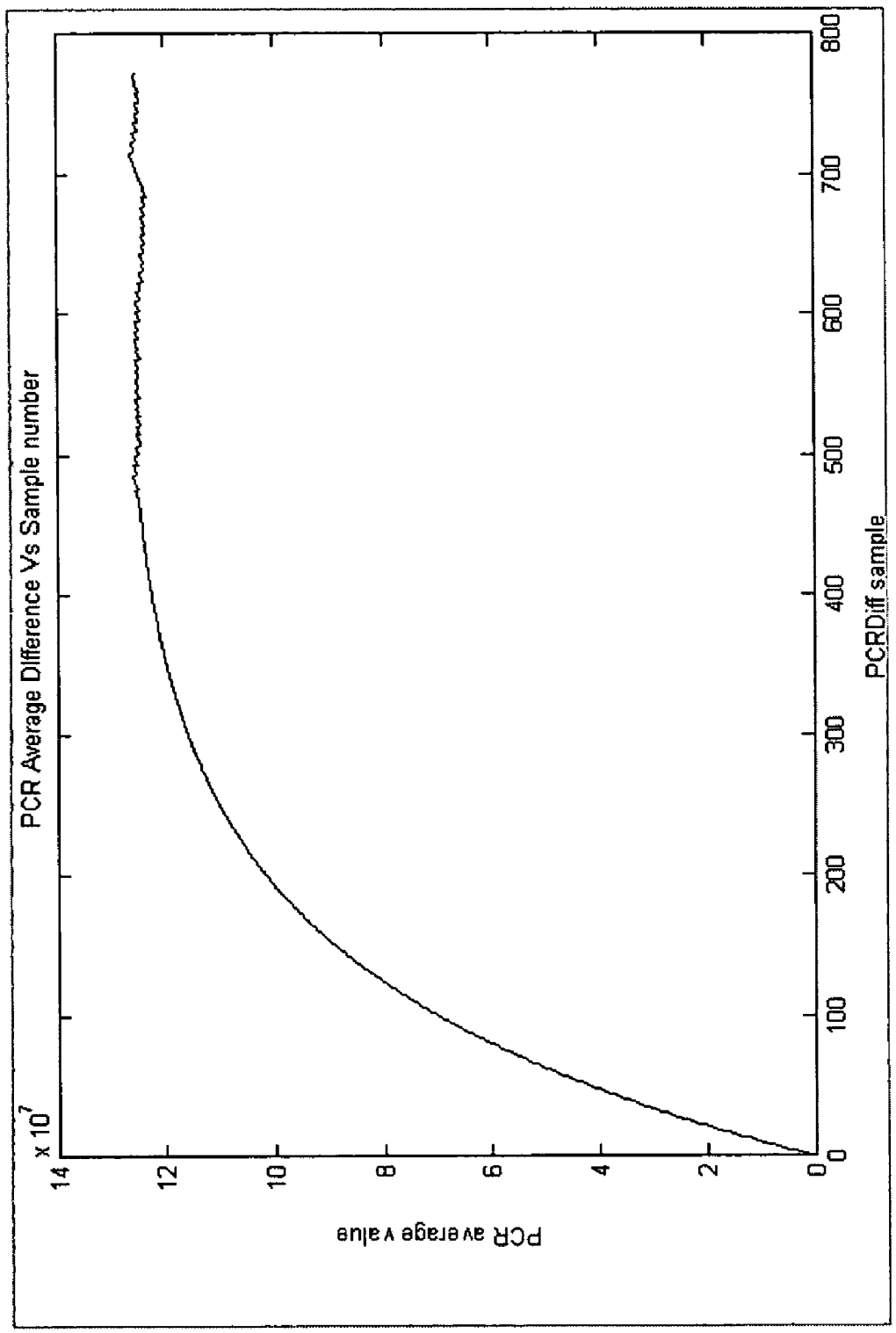
FIG. 7 shows the graph of PCR average filter output convergence to actual average of PCRDifference value (filter output value vs. plot of filter output sample number) according to the instant invention.

Due to PCR jitters in DVB-T transmission, the difference between the STCdiff and PCRdiff values may change arbitrarily, causing loss of synchronization in the receiver side. The system and method of the present invention rectifies this problem. FIG. 7 shows the graph of STC and PCR DIFF value against sample number for the proposed clock recovery method. This figure reveals that the difference between STCdiff and PCRdiff remains constant throughout the whole measurement.

The output of the filter is multiplied by the coefficient $\frac{1}{128}$ to compensate for the gain factor of the filter. This multiplication is implemented as a left shift.

| Instruction/function | Addition/ subtraction | Multiplication | Division | Shift |
|---|---|---|---|---|
| PCR call back task | 6 | 2 | 0 | 3 |
| Clock recovery task | 6 | 6 | 3 | 0 |
| Filter module | 1 | 1 | 1 | 2 |
| Total | 13 | 9 | 4 | 5 |

The table provided above shows that 31 arithmetic operations are executed in every average PCR difference interval. It is observed that average PCR difference is approximately 35 milliseconds. Therefore, the average computational overhead for the system and method of the present invention in terms of arithmetic operations executed per second is:

31/35*1000=886 arithmetic operations per second.

The system and method of the present invention was also tested in worst case channel conditions like ¼ guard interval, with channel fading, low carrier-to-noise ratio, etc. Results shows that:
 1. Color loss is mitigated;
 2. Video jitter is mitigated;
 3. Audio dropout is virtually not present; and
 4. Very low computational overhead is experienced.

Thus, the system and method for clock recovery according to the present invention provides deterministic and minimal computational behavior to the digital video communication clock recovery set up.

While there have been described above the principles of the present invention in conjunction with specific memory architectures and methods of operation, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and that may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof that would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

We claim:

1. A system for clock recovery in digital video communication comprising:

a delay measurement block for generating Program Clock Reference (PCR) input signals and for continuously determining time interval between successive PCR input signals;

a first storage device coupled to the output of said delay measurement block for generating a first PCR signal corresponding to said time interval between arrival of successive PCR input signals;

a PCR inter-arrival time computation filtering device coupled at its first input to the output of said storage device and receiving a second PCR signal from said delay measurement block for determining the average time of arrival difference between successive PCR packets;

an error correction device coupled to the output of said PCR difference measurement element for minimizing the error in the average PCR difference between successive PCR packets;

a controlled system clock generator coupled to the output of said error correction device to generate system clock;

a second storage device coupled at the output of said controlled system clock generator for generating a first system clock output; and a controlled clock period difference computation element having one input coupled to the output of said second storage device and receiving a second system clock output from said controlled system clock generator, for computing the clock period difference between said first and second system clock output, wherein said controlled clock period difference computation element is coupled at its output to said error correction device to form a feedback circuit for minimizing the error between said system clock output and successive PCR differences observed.

2. The system for clock recovery as in claim 1, wherein said delay measurement block comprises a signal parsing device.

3. The system for clock recovery as in claim 2, wherein said signal parsing device comprises a demultiplexing logic device.

4. The system for clock recovery as in claim 1, wherein said PCR inter-arrival time computation filtering device comprises an Infinite Impulse Response filter coupled to a timer.

5. The system for clock recovery as in claim 1, wherein said controlled system clock generator comprises a Phase Locked Loop device.

6. The system for clock recovery as in claim 1, wherein said first and second storage device comprises at least one register.

7. The system for clock recovery as in claim 1, wherein said controlled clock period difference computation element comprises a voltage-to-frequency conversion device.

8. A method for clock recovery in digital video communication comprising:
   determining the time interval between successive input Program Clock Reference (PCR) signals;
   computing the average time difference between successive PCR packets;
   computing the average difference between successive system clock signals;
   generating an error based upon the computed average time difference between successive PCR packets and the computed average difference between successive system clock signals;
   minimizing the generated error; and
   generating successive system clock signals based upon the minimized error.

9. The method for clock recovery in digital video communication as in claim 8, wherein said determining time interval between successive input PCR signals determines the delay between successive system clock signals.

10. The method for clock recovery as in claim 9, wherein said determining delay parses the input PCR signal stream.

11. The method for clock recovery as in claim 10, wherein said parsing the input PCR signal stream comprises demultiplexing the input PCR signal stream for generating the PCR packets.

12. The method for clock recovery in digital video communication as in claim 8, wherein said computing average time duration difference comprises applying filtering on PCR packets to compute the average inter-arrival time of the PCR packets.

13. The method for clock recovery as in claim 12, wherein said filtering comprises correcting the frequency of system clock signals at regular intervals rather than waiting for the arrival of the PCR packets.

14. The method for clock recovery as in claim 13, wherein said correcting the frequency of system clock signals at regular intervals comprises confirming said regular intervals to the average PCR inter-arrival time.

15. The method for clock recovery as in claim 14, wherein said confirming comprises determining the system clock value at the commencement and termination of said inter-arrival time.

16. The method for clock recovery as in claim 8, wherein said generating successive system clock signals comprises generating at least two delayed system clock outputs.

17. The method for clock recovery as in claim 8, wherein said computing the average difference between successive system clock signals comprises converting the average difference between successive system clock signals to frequency error.

* * * * *